(12) United States Patent
Selvaraj (10) Patent No.: US 11,640,325 B2
(45) Date of Patent: May 2, 2023

(54) METHODS AND APPARATUS TO ALLOCATE HARDWARE IN VIRTUALIZED COMPUTING ARCHITECTURES

(71) Applicant: VMWARE, INC., Palo Alto, CA (US)

(72) Inventor: Karthick Selvaraj, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/745,511

(22) Filed: May 16, 2022

(65) Prior Publication Data

US 2022/0382597 A1  Dec. 1, 2022

Related U.S. Application Data

(63) Continuation of application No. 16/145,218, filed on Sep. 28, 2018, now Pat. No. 11,334,395.

(30) Foreign Application Priority Data

Jul. 27, 2018 (IN) .............................. 201841028237

(51) Int. Cl.
  *G06F 9/50* (2006.01)
  *G06F 8/65* (2018.01)
  *G06F 9/455* (2018.01)
(52) U.S. Cl.
  CPC .............. *G06F 9/5077* (2013.01); *G06F 8/65* (2013.01); *G06F 9/45558* (2013.01); *G06F 9/505* (2013.01); *G06F 9/5055* (2013.01); *G06F 2009/45595* (2013.01)
(58) Field of Classification Search
  CPC ........................................................ G06F 9/44
  See application file for complete search history.

(56) References Cited

U.S. PATENT DOCUMENTS

| 8,429,276 | B1 | 4/2013 | Kumar et al. | |
|---|---|---|---|---|
| 9,032,373 | B1 | 5/2015 | Gupta et al. | |
| 11,334,395 | B2 | 5/2022 | Selvaraj | |
| 2002/0194045 | A1 | 12/2002 | Shay et al. | |
| 2004/0049580 | A1* | 3/2004 | Boyd | H04L 69/12 709/242 |
| 2007/0214193 | A1 | 9/2007 | Takahashi et al. | |
| 2010/0198939 | A1 | 8/2010 | Raleigh | |
| 2012/0278045 | A1* | 11/2012 | Saigo | G06Q 10/06 703/1 |
| 2013/0179450 | A1 | 7/2013 | Chitiveli | |
| 2013/0246849 | A1 | 9/2013 | Plamondon | |

(Continued)

OTHER PUBLICATIONS

Kingatua ("Hyper Converged Infrastructure Guide"), Apr. 2018 (Year: 2018).*

(Continued)

*Primary Examiner* — Jae U Jeon
(74) *Attorney, Agent, or Firm* — Hanley, Flight & Zimmerman, LLC (57) ABSTRACT

Methods, apparatus, systems and articles of manufacture are disclosed to allocate hardware in virtualized computing architectures. An example apparatus to manage a virtual server rack comprises a drift analyzer to determine that hardware resources assigned to a virtualized workload domain exceed the resources requested for the virtualized workload domain; and a rebalancer to reassign one or more of the hardware resources in response to an indication from the drift analyzer.

27 Claims, 5 Drawing Sheets

(56) References Cited

U.S. PATENT DOCUMENTS

| | | | |
|---|---|---|---|
| 2014/0215471 | A1 | 7/2014 | Cherkasova et al. |
| 2015/0317173 | A1 | 11/2015 | Anglin et al. |
| 2016/0014073 | A1* | 1/2016 | Reddy ............... H04L 43/16 713/2 |
| 2017/0003951 | A1* | 1/2017 | Newell ............ G06F 9/45558 |
| 2017/0249199 | A1 | 8/2017 | Tripathi |
| 2019/0012194 | A1 | 1/2019 | Yi et al. |
| 2019/0356728 | A1 | 11/2019 | Devilbliss et al. |

OTHER PUBLICATIONS

Kingatua, "Hyper Converged Infrastructure Guide", posted Apr. 8, 2018, 26 pages.

United States Patent and Trademark Office, "Non-Final Office Action," issued in connection with U.S. Appl. No. 16/145,218, dated Mar. 26, 2020, 18 pages.

United States Patent and Trademark Office, "Final Office Action," issued in connection with U.S. Appl. No. 16/145,218, dated Jul. 14, 2020, 19 pages.

United States Patent and Trademark Office, "Non-Final Office Action," issued in connection with U.S. Appl. No. 16/145,218, dated Nov. 3, 2020, 18 pages.

United States Patent and Trademark Office, "Final Office Action," issued in connection with U.S. Appl. No. 16/145,218, dated Feb. 22, 2021, 20 pages.

United States Patent and Trademark Office, "Non-Final Office Action," issued in connection with U.S. Appl. No. 16/145,218, dated Jul. 19, 2021, 6 pages.

United States Patent and Trademark Office, "Notice of Allowance And Fee(s) Due," issued in connection with U.S. Appl. No. 16/145,218, dated Jan. 12, 2022, 9 pages.

* cited by examiner

METHODS AND APPARATUS TO ALLOCATE HARDWARE IN VIRTUALIZED COMPUTING ARCHITECTURES

RELATED APPLICATIONS

Benefit is claimed under 35 U.S.C. 119(a)-(d) to Foreign Application Serial No. 201841028237 filed in India entitled "METHODS AND APPARATUS TO ALLOCATE HARDWARE IN VIRTUALIZED COMPUTING ARCHITECTURES", on Jul. 27, 2018, by VMware, Inc., which is herein incorporated in its entirety by reference for all purposes.

FIELD OF THE DISCLOSURE

This disclosure relates generally to virtualized computing and, more particularly, to methods and apparatus to methods and apparatus to allocate hardware in virtualized computing architectures.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Cloud computing is based on the deployment of many physical resources across a network, virtualizing the physical resources into virtual resources, and provisioning the virtual resources in software defined data centers (SDDCs) for use across cloud computing services and applications. Examples disclosed herein can be used to manage network resources in SDDCs to improve performance and efficiencies of network communications between different virtual and/or physical resources of the SDDCs.

Examples disclosed herein can be used in connection with different types of SDDCs. In some examples, techniques disclosed herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples disclosed herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a containerization. Thus, a process executes within a container that isolates the process from other processes executing on the host OS. In this manner, OS virtualization can be used to provide isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

Figure 1:
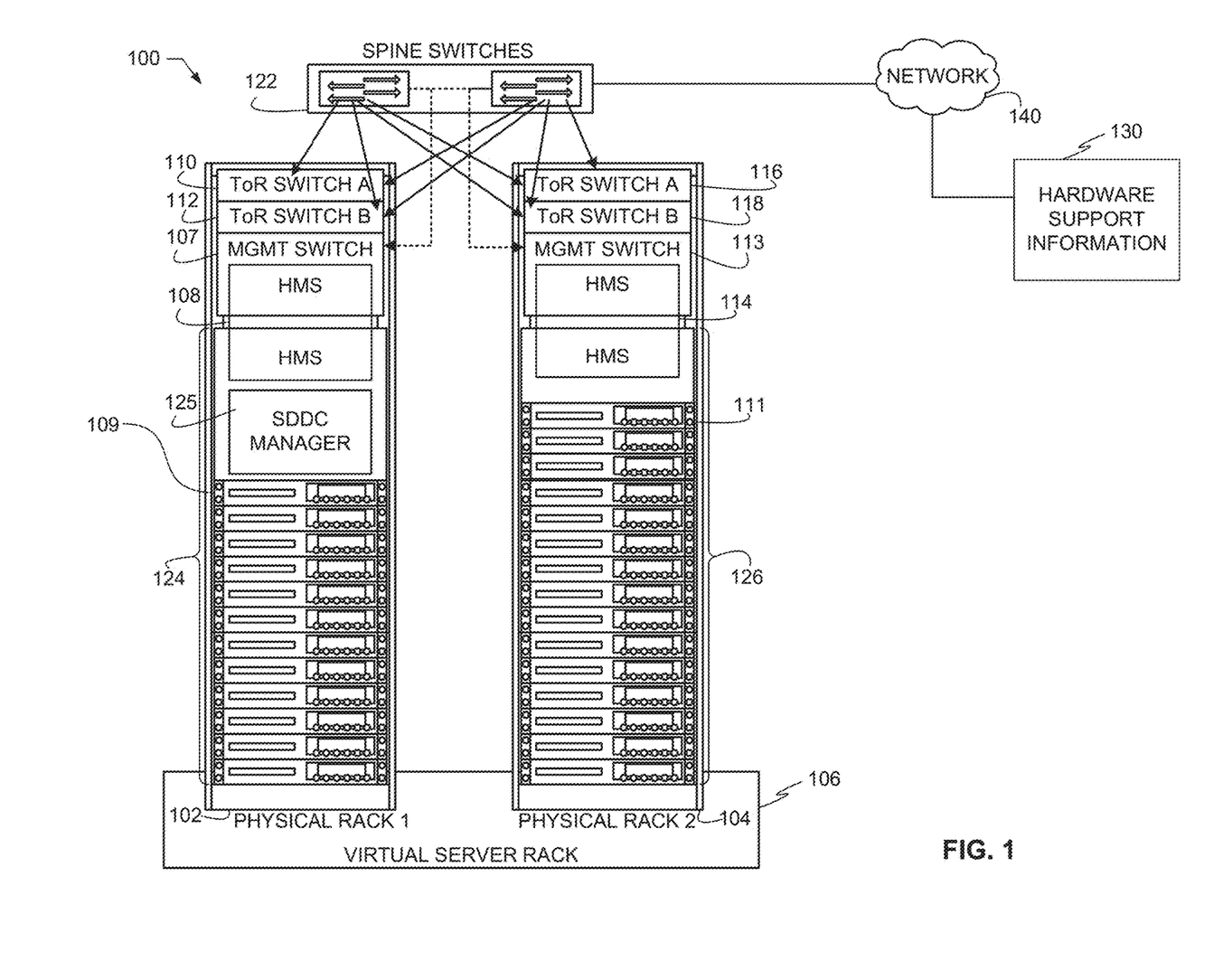
FIG. 1 is a block diagram of an example environment in which a virtual server rack is implemented.

Examples disclosed herein can be employed with HCI-based SDDCs deployed using virtual server rack systems such as the virtual server rack 106 in the illustrated example environment 100 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™ etc.) distributed across multiple hosts for redundancy and virtualized networking software (e.g., VMWARE NSX™, etc.).

In an HCI, compute, storage and network resources are brought together over commodity server and network hardware. The software provides the ability to host application workloads in containers called Workload Domains. A workload domain is a physical collection of compute, storage and network resources that provide uniform characteristics to applications such as security, performance, availability and Data Protection. The commodity servers could be from different vendors composed of different hardware variants. The storage performance characteristics of the hardware depends on the vendor. The selection of particular hardware combinations will control the storage performance characteristics of a commodity server made by a particular vendor.

In HCI, different heterogeneous commodity servers are supported and these servers are selected based on certain hardware capabilities and their support for certain policy based software defined storage systems such as vSAN from VMWARE. A virtualization system vendor may provide a hardware compatibility list that provides a list of servers by various vendors which are certified for a software defined storage platform. These servers are called software defined storage ready nodes. Different hardware may be supported on different versions of the software defined storage platform. Additionally, the input/output (I/O) performance of the hardware may vary based on the software defined storage platform version.

When a workload domain gets created, a user (e.g., an administrator) provides information about the requested storage performance characteristics (e.g., storage system requirements such as expected number of I/Os per second, advanced features like compression, deduplication, etc.). The user may provide additional system requests such as CPU requirements, memory requirements, storage space requirements, etc. Using the requests, a resource allocator in an HCI will find the right set of heterogeneous servers which has enough hardware capabilities to meet the requested characteristics (e.g., storage I/O performance).

However, over time, hardware and software upgrades in the HCI will change the performance characteristics of the various hardware. For example, upgrades to software defined storage platform software may affect the characteristics of the hardware (e.g., new software versions may enable features that provide improved hardware performance). In addition, hardware upgrades may increase the performance of the various hardware components. Such upgrades to software and hardware may change the allocation of the hardware assigned to the various workload domains. For example, upgrades may improve the characteristics of the hardware assigned to a first workload domain such that the characteristics exceed the requested capabilities for the workload domain. Overall, the dynamic change in the hardware characteristics due to the regular periodic hardware refresh and the software defined storage software which gets improved over releases might lead to the imbalanced workload domains which are already formed based on certain characteristics of hardware and the available software defined storage software version at that time. Due to the upgrades, the workload domains could become imbalanced as well as underutilized.

In examples disclosed herein, a management system tracks changing hardware characteristic/scapacity and the different versions of software defined storage (e.g., vSAN) in an HCI environment. The management system compares the hardware to a hardware compatibility list that indicates information about the performance and features provided by hardware used in particular versions of the software defined storage platform. The management system analyzes the hardware allocations after upgrades to determine if the hardware can be reallocated to the various workload domains to balance the utilization of the hardware components. For example, hardware may be reassigned from one workload domain to another.

The management system according to some examples, determines if workload domain requirements are met whenever possible. The management system selects one of more server nodes and swaps them with servers which are just enough to meet the workload domain requirements. By assigning hardware to workload domains to meets the workload domain requirements without greatly exceeding the workload domain requirements, hardware above-and-beyond the requirements can be freed for utilization with our needs (e.g., other workload domains). For example, upgrading the software defined storage platform version may cause a combination of hardware resources to increase in performance capabilities. The increase may cause the combination of hardware resources to exceed the requirements of an assigned workload domain. Some of the hardware resources may be reassigned while still meeting the requirements of the workload domain.

Accordingly, in some examples disclosed herein, improvements are provided to the technology of virtualized computing environments by providing a system to detect and respond to hardware and software changes. By detecting changes and reallocating hardware among workload domains, available computing resources are assigned to maximize utilization and serving of the workload domain requirements.

FIG. 1 illustrates example physical racks 102, 104 in an example deployment of a virtual server rack 106. The virtual server rack 106 of the illustrated example enables abstracting hardware resources (e.g., physical hardware resources 124, 126, etc.). In some examples, the virtual server rack 106 includes a set of physical units (e.g., one or more racks, etc.) with each unit including hardware such as server nodes (e.g., compute+storage+network links, etc.), network switches, and, optionally, separate storage units. From a user perspective, the example virtual server rack 106 is an aggregated pool of logic resources exposed as one or more VMWARE ESXI™ clusters along with a logical storage pool and network connectivity. As used herein, the term "cluster" refers to a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR switch A 110, an example ToR switch B 112, an example management switch 107, and an example server host node 109. In the illustrated example, the management switch 107 and the server host node 109 run a hardware management system (HMS) 108 for the first physical rack 102. The second physical rack 104 of the illustrated example is also provided with an example ToR switch A 116, an example ToR switch B 118, an example management switch 113, and an example server host node 111. In the illustrated example, the management switch 113 and the server host node 111 run an HMS 114 for the second physical rack 104.

In the illustrated example, the HMS 108, 114 connects to server management ports of the server host node 109, 111 (e.g., using a baseboard management controller (BMC), etc.), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In some examples, the spine switches 122 can be powered on or off via the SDDC manager 125, 127 and/or the HMS 108, 114 based on a type of network fabric being used. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private IP management network for out-of-band (OOB) management. The HMS 108, 114 of the illustrated example uses this OOB management interface to the server management ports of the server host node 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management.

In the illustrated example, the ToR switches 110, 112, 116, 118 connect to server NIC ports (e.g., using 10 Gbps links, etc.) of server hosts in the physical racks 102, 104 for downlink communications and to the spine switch(es) 122 (e.g., using 40 Gbps links, etc.) for uplink communications. In the illustrated example, the management switch 107, 113 is also connected to the ToR switches 110, 112, 116, 118 (e.g., using a 10 Gbps link, etc.) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126, etc.) of the physical rack 102, 104. In the illustrated example, the IB connection interfaces to physical hardware resources 124, 126 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical hardware resources 124, 126 and to keep server objects and switch objects up to date. Example IB operations performed by the HMS 108, 114 include controlling power state, accessing temperature sensors, controlling Basic Input/Output System (BIOS) inventory of hardware (e.g., CPUs, memory, disks, etc.), event monitoring, and logging events.

The HMSs 108, 114 of the corresponding physical racks 102, 104 interface with an example software-defined data center (SDDC) manager 125 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the SDDC manager 125 runs on a cluster of three server host nodes of the first physical rack 102, one of which is the server host node 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit.

In the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The SDDC manager 125 runs on a cluster of three server host nodes of the first physical rack 102 using a high availability (HA) mode configuration. Using the HA mode in this manner, enables fault tolerant operation of the SDDC manager 125, in the event that one of the three server host nodes in the cluster for the SDDC manager 125 fails. Upon failure of a server host node executing the SDDC manager 125, the SDDC manager 125 can be restarted to execute on another one of the hosts in the cluster. Therefore, the SDDC manager 125 continues to be available even in the event of a failure of one of the server host nodes in the cluster.

In the illustrated example, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.). There is also a configuration buffer as part of the switch object which stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113, etc.) in the physical rack 102, 104. However, any other programming language and any other OS may be used to implement the HMS 108, 114.

In the illustrated example of FIG. 1, the SDDC manager 125 allocates a first subset of the server host nodes of the first physical rack 102 and server host nodes of the second physical rack 104 to a first workload domain. The first workload domain can execute a computing task specified by a user such as executing an application, processing data, performing a calculation, etc. Further, the SDDC manager 125 allocates a second subset of the server host nodes of the first physical rack 102 and the server hosts nodes of the second physical rack 104 to a second workload domain.

The example SDDC manager 125 receives information about hardware changes from the physical hardware resources 124, 126 and analyzes the information to determine if hardware drift has occurred due to hardware upgrades and/or software upgrades. To determine operational characteristics, performance characteristics, etc. about the combinations of hardware and software (e.g., the version of the software defined storage platform), the example SDDC manager 125 accesses example hardware support information 130 via an example network 140. For example, the SDDC manager 125 may determine that the hardware resources assigned to a workload domain exceed the requirements of the workload domain following hardware and/or software upgrades. As further described in conjunction with FIG. 2, the example SDDC manager 125 reassigns hardware resources after detecting drift (e.g., the SDDC manager 125 may free excess resources for utilization with later needs of a workload domain and/or may reassign the hardware resources to another workload domain that is in need of additional resources.

The example hardware support information is a database storing information that indicating performance characteristics (e.g., IOPS, read rates, write rates, etc.) and features (e.g., compression, deduplication, erasure coding, etc.) supported by particular hardware with particular versions of hardware. The example database is coupled to the virtual server rack and the SDDC manager 125 via the example network 140. Alternatively, any other data structure and/or device may store the hardware support information.

In the illustrated example of FIG. 1, the network 140 is the Internet. However, the example network 140 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 140 enables the SDDC manager 125 to be in communication with external devices such as the example hardware support information 140, external storage resources, etc. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events. Alternatively, the phrase "in communication," including variances therefore, may encompass direct physical communication and/or constant communication.

In operation of the example system 100, a user creates workload domains on the example virtual server rack 106 by providing performance requests/requirements for the workload domains. The SDDC manager 125 locates ones of the physical hardware resources 124, 126 that will meet the performance requests/requirements. The example SDDC manager 125 receives event notifications indicative of hardware and/or software modifications to the example first physical rack 102 and the example second physical rack 104. The example SDDC manager determines if drift has occurred indicating that the hardware resources are improperly assigned to the changes (e.g., the physical hardware resources 124, 126 are under utilized because they are assigned to workload domains that do not utilize the full capabilities of the hardware resources). When drift has occurred, the example SDDC manager 125 reassigns the physical hardware resources 124, 126 to the workload domains to efficiently utilize the physical hardware resources 124, 126.

Figure 2:
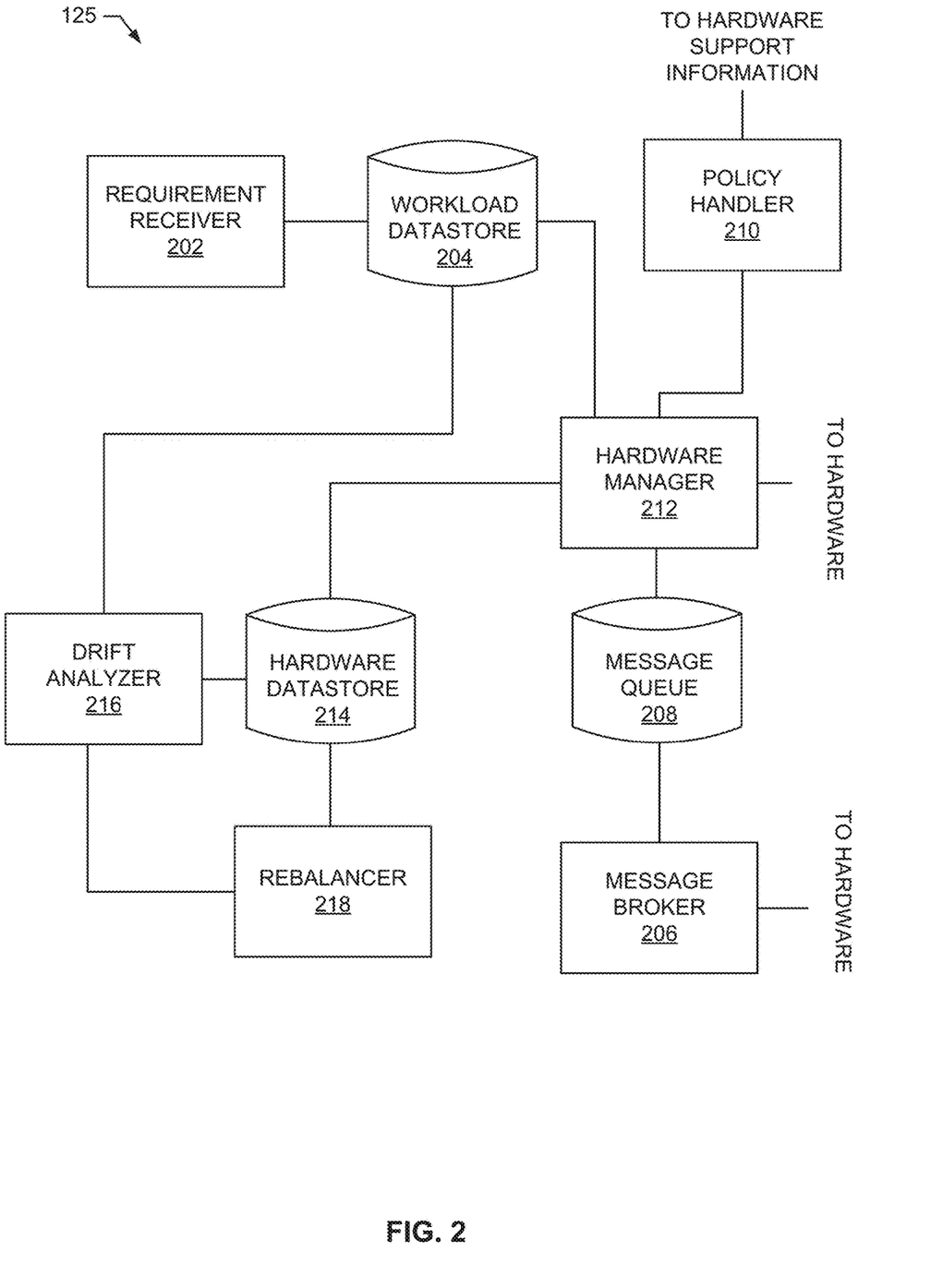
FIG. 2 is block diagram of an example implementation of the SDDC manager of FIG. 1.

FIG. 2 is a block diagram of an example implementation of the SDDC manager 125 of FIG. 1. The example SDDC manager 125 of FIG. 2 includes an example requirement receiver 202, an example workload datastore 204, an example message broker 206, an example message queue 208, an example policy handler 210, an example hardware manager 212, an example hardware datastore 214, an example drift analyzer 216, and an example rebalancer 218.

The example requirement receiver 202 provides a graphical user interface to enable a user to input requirements for a workload domain (e.g., a workload domain to be created). Alternatively, the requirement receiver 202 may obtain workload domain requirements in any other manner such as received in a network communication, retrieved from a datastore, etc.

The example requirement receiver 202 stores received requirement information in the example workload datastore 204. The example workload datastore 204 is a database. Alternatively, the workload datastore 204 may be implemented by any other type of storage device and/or data structure.

The example message broker 206 of the illustrated example registers with the example physical hardware resources 124, 126 to receive updates regarding updates to hardware and/or software (e.g., software defined storage platform software versions). For example, an agent may be installed at each of the example physical hardware resources 124, 126. The example agent may collect information about the hardware and/or software and push the information to a message broker that has registered with the agent (e.g., the example message broker 206). The example message broker 206 stores received information in the example message queue 208.

The example message queue 208 is a queue of reported hardware information. The message queue 208 may store an inventory of hardware details and/or may store indications of hardware changes. Alternatively, the message queue 208 may be any other type of storage device and/or data structure such as a database.

The example policy handler 210 retrieves updated hardware support information from the example hardware support information 140 for hardware identified by the example hardware manager 212. The hardware support information provides characteristics, performance information, version compatibility information, etc. for the hardware.

The example hardware manager 212 analyzes workload domain requirement information in the example workload datastore 204 and hardware information received via the example message queue 208 to assign the physical hardware resources 124, 126 to newly created workload domains based on the information from the example policy handler 210. The example hardware manager 212 tracks hardware updates and inventories hardware information received via the example message queue 208 and stores the latest hardware information and hardware support information in the example hardware datastore 214. When assigning the physical hardware resources 124, 126 to the workload domains, the example hardware manager 212 selects hardware resources that meet the requests/requirements stored in the example workload datastore 204. According to the illustrated example, the hardware manager 212 selects combinations of hardware that meet the requests/requirements without greatly exceeding the requests/requirements. Such an approach ensures that hardware resources are not reserved for a workload domain that is not using them while other workload domains are in need of resources. The example hardware manager 212 communicates the assignment of the hardware resources to the example hardware management system 108, 114 and the example hardware datastore 214. As described in further detail in conjunction with the example rebalancer 218, when the example rebalancer 218 performs rebalancing to change the assignment of hardware, the example hardware manager 212 retrieves the updated assignment information from the example hardware datastore 214 and transmits the assignment information to the example HMS 108, 114.

The example hardware datastore 214 is a database. Alternatively, the hardware datastore 214 may be any other type of storage device or data structure.

The example drift analyzer 216 periodically analyzes the updated hardware information and hardware support information stored in the example hardware datastore 214 to determine if hardware resources are appropriately assigned to workload domains. According to the illustrated example, the drift analyzer 216 determines if the hardware resources assigned to a workload provide capabilities that exceed the needs of the workload domain. For example, when hardware resources are assigned to a workload domain to meet the requirements of the workload domain, but the hardware resources provide improved capabilities (e.g., due to a physical hardware upgrade or a upgrade in performance due to a version change in the platform software such as software defined storage platform software), the drift analyzer 216 determines that drift has occurred and rebalancing should be performed.

The example rebalancer 218 analyzes the updated hardware information to reallocate the physical hardware resources 124, 126 to workload domains and stores the updated information in the example hardware datastore 214 for the example hardware manager 212 to distribute to the example HMS 108, 114.

While an example manner of implementing the example SDDC manager 125 of FIG. 1 is illustrated in FIG. 2, one or more of the elements, processes and/or devices illustrated in FIG. 2 may be combined, divided, re-arranged, omitted, eliminated and/or implemented in any other way. Further, the example requirement receiver 202, the example workload datastore 204, the example message broker 206, the example message queue 208, the example policy handler 210, the example hardware manager 212, the example hardware datastore 214, the example drift analyzer 216, the example rebalancer 218, and/or, more generally, the example SDDC manager 125 of FIG. 1 may be implemented by hardware, software, firmware and/or any combination of hardware, software and/or firmware. Thus, for example, any of the example requirement receiver 202, the example workload datastore 204, the example message broker 206, the example message queue 208, the example policy handler 210, the example hardware manager 212, the example hardware datastore 214, the example drift analyzer 216, the example rebalancer 218, and/or, more generally, the example SDDC manager 125 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example requirement receiver 202, the example workload datastore 204, the example message broker 206, the example message queue 208, the example policy handler 210, the example hardware manager 212, the example hardware datastore 214, the example drift analyzer 216, and/or the example rebalancer 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example SDDC manager 125 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
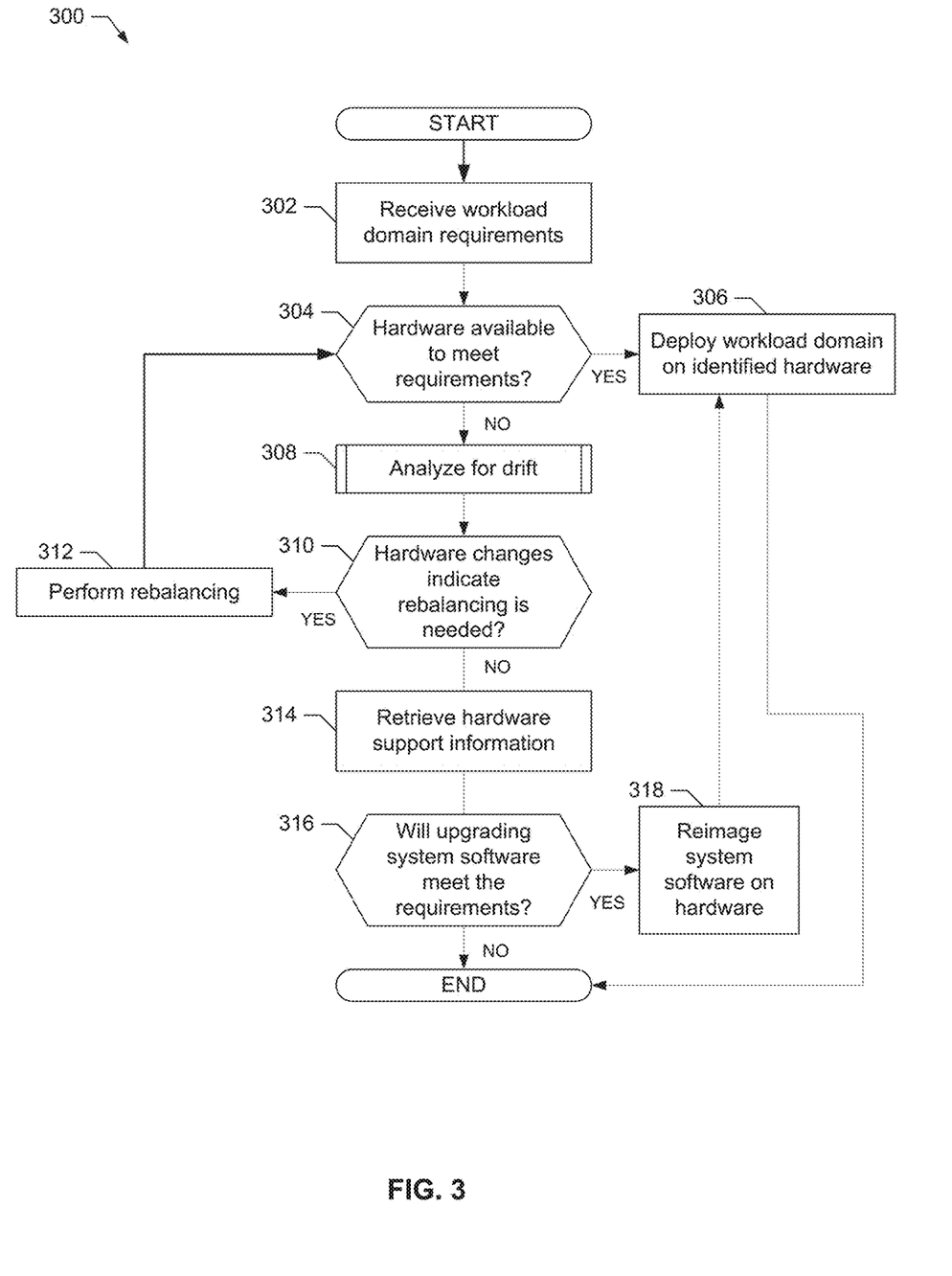
FIGS. 3-4 are flowcharts representative of machine readable instructions which may be executed to implement the SDDC manager of FIG. 1 and/or FIG. 2.
Figure 4:
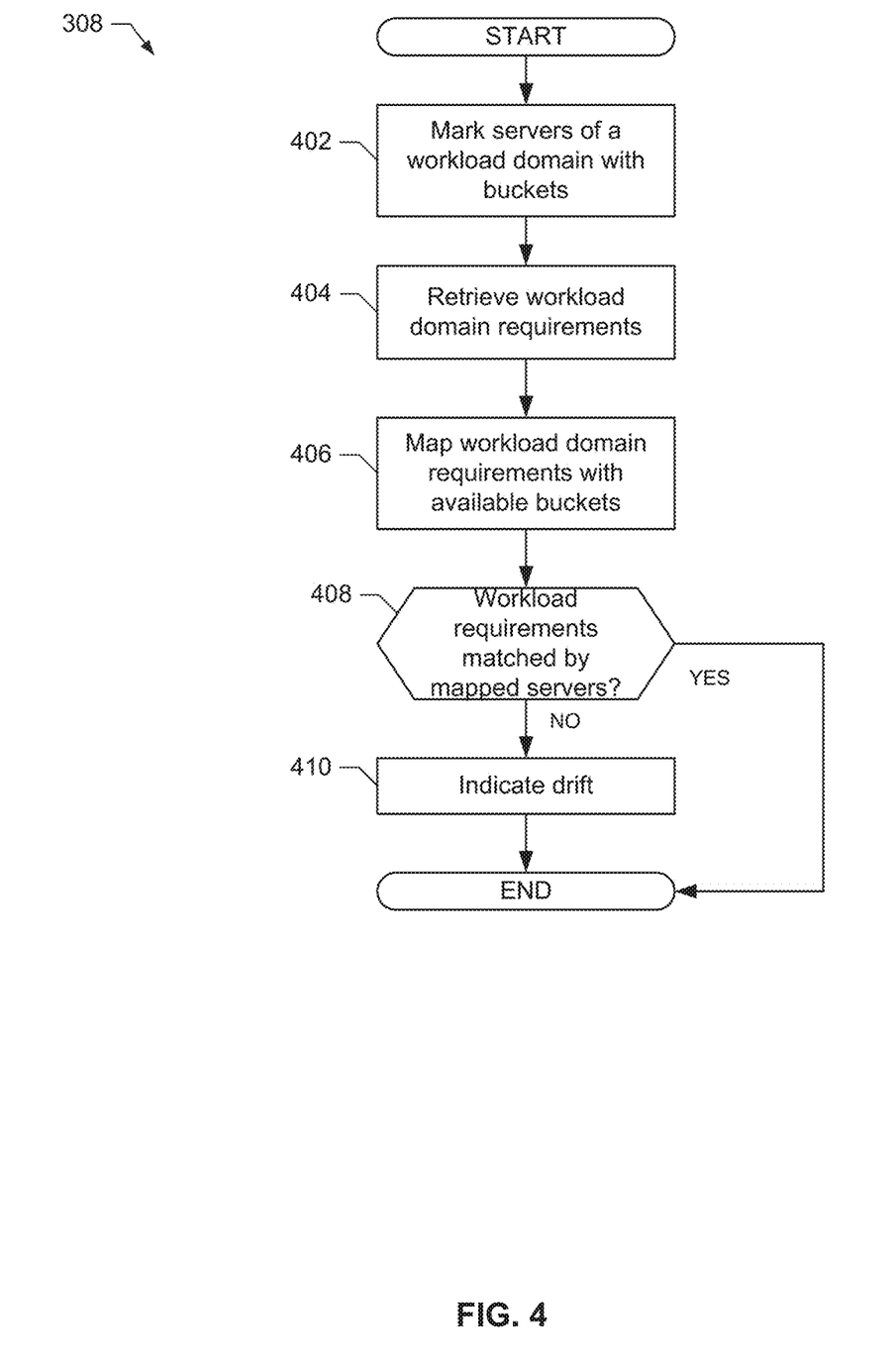

Flowcharts representative of example hardware logic, machine readable instructions, hardware implemented state machines, and/or any combination thereof for implementing the SDDC manager 125 of FIG. 1 and/or FIG. 2 are shown in FIGS. 3-4. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3-4, many other methods of implementing the example SDDC manager 125 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program 300 of FIG. 3 begins when the example requirement receiver 202 receives workload domain requirements for a workload domain to be created (block 302). The example hardware manager 212 determines if there are hardware resources (e.g., the example physical hardware resources 124, 126 available (e.g., not already assigned to another workload domain) to meet the requirements (block 304). When there are sufficient hardware resource available, the example hardware manager 212 deploys the workload domain on the identified hardware resources (block 306) and the process 300 of FIG. 3 completes.

When there are not sufficient hardware resources available to meet the identified requirements (block 304), the example drift analyzer 216 performs a drift analysis (block 308). The example drift analyzer 216 determines if hardware changes indicate that rebalancing is needed (e.g., that drift has occurred) (block 310). When drift has occurred, the example rebalancer 218 performs rebalancing to reassign hardware to workload domains (block 312). For example, the rebalancer 218 may reassign hardware that exceeds the requirements for a workload domain (e.g., where the capabilities of the assigned hardware has increased due to hardware upgrades and/or upgrades to platform software that results in improved capabilities). Control then returns to block 304 to determines if there are now sufficient resources.

When the drift analyzer 216 determines that hardware changes do not indicate that rebalancing is needed (block 310), the example hardware a manager 212 retrieves updated hardware support information via the example policy handler 210 (block 314). For example, the hardware manager 212 may retrieve an inventory of hardware from the example hardware datastore 214 and may instruct the policy handler 210 to retrieve hardware support information from the example hardware support information 130 via the example network 140. The hardware support information may indicate capabilities of the hardware based on the available version(s) of the platform (e.g., the software defined storage platform version). The example hardware manager 212 determines if upgrading software will provide additional capabilities to the virtual server rack 106 (block 316). For example, the hardware manager 212 may determine if the capabilities of the available hardware will be increased when using an upgrade version of system software. In some examples, the hardware manager 212 may only determine that upgrading the system software will meet the requirements if a capability that is deficient based on the analysis in block 304 will be increased by the upgrade. For example, if upgrading the version will increase a capability for which there is currently sufficient capabilities, upgrading may not be warranted.

When upgrading system software will not aid in meeting the requirements (block 316), the process 300 of FIG. 3 terminates. In some cases, a warning, alert, message, etc. will be issued to alert the user that the workload domain cannot be created to meet the identified requirements.

When upgrading the system software will aid in meeting the requirements (block 316), the example hardware manager reimages system software on the hardware (e.g., upgrades the version of the software defined storage platform) (block 318). Control then returns to block 306 to deploy the requested workload domain on the hardware.

FIG. 4 is a flowchart illustrating an example implementation of block 308 of FIG. 3 to perform a drift analysis. According to the illustrated example, the process begins when the hardware manager 212 marks the servers of a workload domain into buckets based on hardware capacity, characteristics, vendor, type, etc. (block 402). The example drift analyzer 216 retrieves workload domain requirements from the example workload datastore 204 (block 404). The example drift analyzer 216 maps the workload domain requirements and the resources assigned to the workload domain with the available buckets (block 406). The example drift analyzer 216 determines if the workload requirements are matched by the mapped hardware resources (block 408). For example, the drift analyzer 216 may determine if low performance resources are assigned to workload domains with low performance requirements and if high performance resources are assigned to workload domains with high performance requirements. In some examples, the drift analyzer 216 may determine that drift has occurred and should be rebalanced when the hardware resources assigned to a workload domain exceed the requirements/requests of the workload. For example, the drift analyzer 216 may determine that drift has not occurred when the assigned hardware resources "just" meet the requirements of the workload domain (e.g., when the hardware resource capabilities do not exceed the requirements by more than a threshold). For example, the drift analyzer 216 may determine that drift has occurred when the capabilities of the hardware resources exceed the requirements/requests by more than a quantity (e.g., 1000 IOPS), by more than a percentage (e.g., 10% of a requirement).

When workload domain requirements do not match resource capabilities (block 408), the drift analyzer 216 indicates that drift has occurred (block 410). Otherwise, the process 400 of FIG. 4 terminates.

Figure 5:
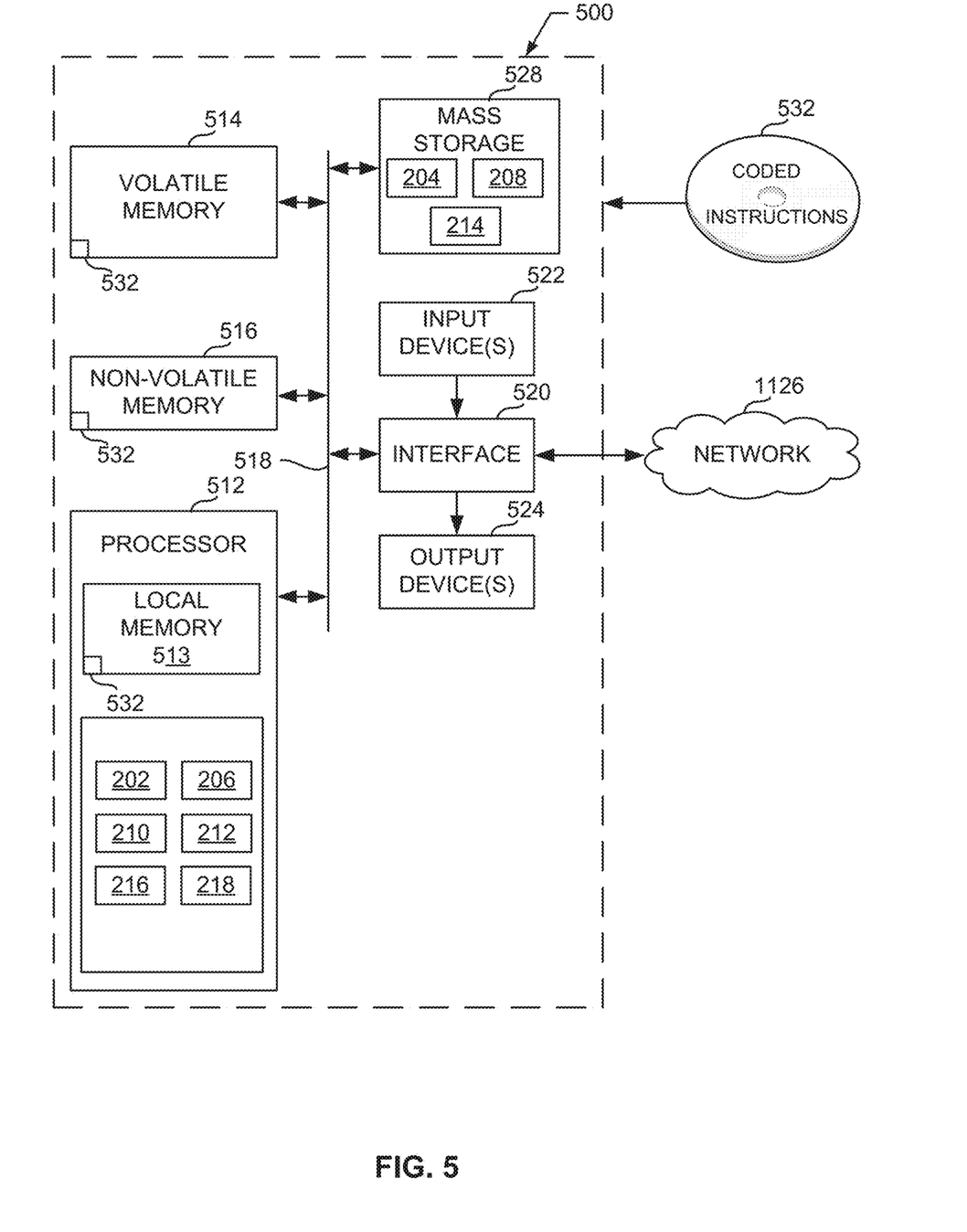
FIG. 5 is a block diagram of an example processing platform structured to execute the instructions of FIG. 3-4 to implement the SDDC manager of FIG. 1 and/or FIG. 2.

FIG. 5 is a block diagram of an example processor platform 500 structured to execute the instructions of FIGS. 3-4 to implement the SDDC manager 125 of FIG. 1 and/or FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example requirement receiver 202, the example message broker 206, the example policy handler 210, the example hardware manager 212, the example drift analyzer 216, and the example rebalancer 218.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives. In the illustrated example, the mass storage 528 includes the workload datastore 204, the message queue 208, and the hardware datastore 214

The machine executable instructions 532 of FIGS. 3-5 may be stored in the mass storage device 528, in the volatile memory 514, in the non-volatile memory 516, and/or on a removable non-transitory computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage a virtual server rack, the apparatus comprising:
a memory;
machine executable instructions;

at least one processor circuitry to execute the instructions to:
  designate a plurality of servers of the virtual server rack for a workload domain into a plurality of categories based on an associated plurality of resource characteristics;
  obtain a set of workload domain requirements and a set of resources assigned to the workload domain;
  map at least one of the set of workload domain requirements or a set of resources assigned to the workload domain to the plurality of categories, ones of the plurality of categories containing a designated server of the plurality of servers;
  determine that the set of resources assigned to a mapped category of the plurality of categories exceed resources requested for the workload domain; and
  reassign one or more of the set of resources in response to the determination.

2. The apparatus as defined in claim 1, wherein the processor circuitry executes the instructions to determine that the set of resources assigned to the mapped category of the plurality of categories satisfy the resources requested for the workload domain.

3. The apparatus as defined in claim 1, wherein the processor circuitry executes the instructions to determine that the set of resources assigned to the mapped category of the plurality of categories exceed resources requested for the workload domain when the set of resources assigned to the mapped category of the plurality of categories exceed the resources requested for the workload domain by more than a threshold quantity.

4. The apparatus as defined in claim 1, wherein the processor circuitry executes the instructions to obtain the set of workload domain requirements and a set of resources assigned to the mapped category of the plurality of categories based on a version of platform software for the virtual server rack.

5. The apparatus as defined in claim 1, wherein the processor circuitry executes the instructions to further receive a notification of a change to the set of resources assigned to the mapped category of the plurality of categories.

6. The apparatus as defined in claim 5, wherein the notification indicates that the set of resources have been updated.

7. The apparatus as defined in claim 5, wherein the notification indicates that platform software associated with the set of resources has been upgraded.

8. The apparatus as defined in claim 7, wherein the processor circuitry executes the instructions to conduct a drift analysis in response to detecting an upgrade to platform software.

9. The apparatus as defined in claim 1, wherein the set of resources are storage resources for a software defined storage platform.

10. A non-transitory computer readable medium comprising instructions that, when executed, cause a machine to at least:
  designate a plurality of servers of a virtual server rack for a workload domain into a plurality of categories based on an associated plurality of resource characteristics;
  obtain a set of workload domain requirements and a set of resources assigned to the workload domain;
  map at least one of the set of workload domain requirements or a set of resources assigned to the workload domain to the plurality of categories, ones of the plurality of categories containing a designated server of the plurality of servers;
  determine that the set of resources assigned to a mapped category of the plurality of categories exceed resources requested for the workload domain; and
  reassign one or more of the set of resources in response to the determination.

11. The non-transitory computer readable medium as defined in claim 10, wherein the instructions, when executed, cause the machine to determine that the set of resources assigned to the mapped category of the plurality of categories satisfy the resources requested for the workload domain.

12. The non-transitory computer readable medium as defined in claim 10, wherein the instructions, when executed, cause the machine to determine that the set of resources assigned to the mapped category of the plurality of categories exceed resources requested for the workload domain when the set of resources assigned to the mapped category of the plurality of categories exceed the resources requested for the workload domain by more than a threshold quantity.

13. The non-transitory computer readable medium as defined in claim 10, wherein the instructions, when executed, cause the machine to obtain the set of workload domain requirements and a set of resources assigned to the mapped category of the plurality of categories based on a version of platform software for the virtual server rack.

14. The non-transitory computer readable medium as defined in claim 10, wherein the instructions, when executed, cause the machine to receive a notification of a change to the set of resources assigned to the mapped category of the plurality of categories.

15. The non-transitory computer readable medium as defined in claim 14, wherein the notification indicates that the set of resources have been updated.

16. The non-transitory computer readable medium as defined in claim 14, wherein the notification indicates that platform software associated with the set of resources has been upgraded.

17. The non-transitory computer readable medium as defined in claim 16, wherein the instructions, when executed, cause the machine to conduct a drift analysis in response to detecting an upgrade to platform software.

18. The non-transitory computer readable medium as defined in claim 10, wherein the set of resources are storage resources for a software defined storage platform.

19. A method to manage a virtual server rack, the method comprising:
  designating a plurality of servers of the virtual server rack for a workload domain into a plurality of categories based on an associated plurality of resource characteristics;
  obtaining a set of workload domain requirements and a set of resources assigned to the workload domain;
  mapping at least one of the set of workload domain requirements or a set of resources assigned to the workload domain to the plurality of categories, ones of the plurality of categories containing a designated server of the plurality of servers;
  determining that the set of resources assigned to a mapped category of the plurality of categories exceed resources requested for the workload domain; and
  reassigning one or more of the set of resources in response to the determination.

20. The method as defined in claim 19, further including determining that the set of resources assigned to the workload domain satisfy the resources requested for the workload domain.

21. The method as defined in claim 19, further including determining that the set of resources assigned to the mapped category of the plurality of categories exceed resources requested for the workload domain when the set of resources exceed the resources requested for the workload domain by more than a threshold quantity.

22. The method as defined in claim 19, further including obtaining the set of workload domain requirements and a set of resources assigned to the mapped category of the plurality of categories based on a version of platform software for the virtual server rack.

23. The method as defined in claim 19, further including receiving a notification of a change to the set of resources assigned to the mapped category of the plurality of categories.

24. The method as defined in claim 23, wherein the notification indicates that the set of resources have been updated.

25. The method as defined in claim 23, wherein the notification indicates that platform software associated with the set of resources has been upgraded.

26. The method as defined in claim 25, further including conducting a drift analysis in response to detecting an upgrade to platform software.

27. The method as defined in claim 19, wherein the set of resources are storage resources for a software defined storage platform.

* * * * *